(12) United States Patent
Jacobs

(10) Patent No.: US 11,834,182 B2
(45) Date of Patent: Dec. 5, 2023

(54) PROTECTIVE AVIATION GARMENT

(71) Applicant: David Clark Company Incorporated, Worcester, MA (US)

(72) Inventor: Shane E. Jacobs, Worcester, MA (US)

(73) Assignee: David Clark Company Incorporated, Worcester, MA (US)

( * ) Notice: Subject to any disclaimer, the term of this patent is extended or adjusted under 35 U.S.C. 154(b) by 458 days.

(21) Appl. No.: 17/155,341

(22) Filed: Jan. 22, 2021

(65) Prior Publication Data
US 2022/0234738 A1 Jul. 28, 2022

(51) Int. Cl.
*B64D 10/00* (2006.01)
*A41D 31/102* (2019.01)
*A41D 13/005* (2006.01)
*A41D 31/08* (2019.01)

(52) U.S. Cl.
CPC ......... *B64D 10/00* (2013.01); *A41D 13/0053* (2013.01); *A41D 31/085* (2019.02); *A41D 31/102* (2019.02); *B64D 2010/005* (2013.01); *B64D 2010/007* (2013.01)

(58) Field of Classification Search
CPC .............. B64D 10/00; B64D 2010/002; B64D 2010/005; B64D 2010/007; A41D 31/102; A41D 31/085; A41D 13/0053
See application file for complete search history.

(56) References Cited

U.S. PATENT DOCUMENTS

| | | | |
|---|---|---|---|
| 2,379,497 A | 7/1945 | Sellmeyer | |
| 2,762,047 A * | 9/1956 | Ruseckas | B64D 10/00 600/20 |
| 4,674,479 A | 6/1987 | Jennings et al. | |
| 5,003,630 A | 4/1991 | Bassick et al. | |
| 5,394,563 A | 3/1995 | Doyle | |
| 6,325,754 B1 | 12/2001 | Reinhard et al. | |
| 6,695,762 B1 * | 2/2004 | Mah | B64G 6/00 600/20 |
| 7,076,808 B2 | 7/2006 | Bassick et al. | |
| 2022/0183405 A1 * | 6/2022 | Beyeler | A41D 13/0543 |

OTHER PUBLICATIONS

Search Report in GB Application No. GB2200488.1 dated Jul. 13, 2022 (1 page).

* cited by examiner

*Primary Examiner* — Samuel G Gilbert
(74) *Attorney, Agent, or Firm* — Burns & Levinson LLP; Steven M. Mills

(57) ABSTRACT

A protective aviation garment is designed to protect a crewmember during flight. The garment includes a bladder layer which retains a pressurized fluid and applies pressure to the user. The bladder layer is semi-permeable, being impermeable to both oxygen and nitrogen and permeable to water vapor. A first fluid tube is formed as part of the bladder layer to deliver the pressurized fluid to the interior of the bladder layer. A cover layer is formed from a fire-retardant fabric surrounding the exterior of the bladder layer. The cover layer is sealed around the first fluid tube and allows the first fluid tube to pass therethrough. The thigh seals are configured to seal the bladder layer to the user such that the bladder layer forms a lower volume and an upper volume. The first fluid tube delivers the first pressurized fluid to the lower volume.

19 Claims, 16 Drawing Sheets

PROTECTIVE AVIATION GARMENT

FIELD OF THE TECHNOLOGY

The subject disclosure relates to protective garments, and more particularly to protective garments worn by crewmembers during the flight of high performance aircraft.

BACKGROUND OF THE TECHNOLOGY

Various protective garments have been utilized to protect crewmembers during flight. Often, crewmembers will wear multiple separate garments during a flight. This can include an outer pressure garment designed to apply pressure to the lower torso and/or legs of a user. In some cases, the pressure garment may cover more than just the lower body of the user, additionally covering the upper torso and arms. The pressure garment provides G-force protection for the user during flight. In many cases, the pressure garment is formed between two separate layers, and can be an enclosed by another, separate outer suit layer. A coverall is additionally worn underneath the pressure garment, and over the entire body of the user. The coverall provides protection against hazards from the external environment, such as from water or a possible fire. Further, these garments can also be hot, and additional garments are sometimes worn to provide liquid cooling to the user for comfort, or even safety.

While the combination of a multiple layer pressure garment, coverall, and liquid cooling garment generally serves their desired purposes, this setup is imperfect for a number of reasons. First, the suit being multiple separate garments can create an ongoing source of discomfort because of the bulk, weight, and independent movement of the various garments. It can also be difficult to disperse heat through the bulk of the suit, particularly since the suit can inhibit evaporation of a user's natural perspiration. Solutions to this problem, and others are limited, given that the user's perspiration must escape through two separate garments. Additionally, existing suits provide no practical way for a crewmember to urinate during flight. This results in crewmembers drinking few fluids prior to flight, which can be dangerous, particularly during long flights when the crewmember could become dehydrated. Even suits which allow urination typically require the user to manipulate the suit and compromise their restraints, resulting in a dangerous condition. Therefore, there is a need for an improved aviation garment.

SUMMARY OF THE TECHNOLOGY

In light of the needs described above, in at least one aspect, the subject technology relates to an aviation garment which combines multiple layers securely in a single garment.

In at least one aspect, the subject technology relates to a garment configured to protect a user during aircraft flight. A bladder layer is configured to retain a first pressurized fluid and apply pressure to the user, the bladder layer being a semi-permeable layer which is impermeable to both oxygen and nitrogen and permeable to water vapor. A first fluid tube is formed as part of the bladder layer and configured to deliver the first pressurized fluid to an interior of the bladder layer. A cover layer is formed from a fire-retardant fabric, the cover layer surrounding an exterior of the bladder layer, the cover layer sealed around the first fluid tube and allowing the first fluid tube to pass therethrough. Two thigh seals are configured to seal the bladder layer to the user such that the bladder layer forms a lower volume and an upper volume. The first fluid tube is configured to deliver the first pressurized fluid to the lower volume.

In some embodiments, the garment includes a second fluid tube formed as part of the bladder layer and configured to deliver a second pressurized fluid to the interior of the bladder layer at the upper volume. The cover layer is then sealed around the second fluid tube, allowing the second fluid tube to pass therethrough. In some cases, the upper volume is configured to be pressurized up to 50 mmHg and the lower volume is configured to be pressurized up to 12 psig. The bladder layer can be formed from a plurality of separate sections stitched together with nylon thread. The seams of the nylon thread can be sealed with tape within the interior of the bladder layer.

In some embodiments, the bladder layer includes a boot region defined by an air and water impermeable fabric in the shape of boots. The air and water impermeable fabric can be urethane-coated nylon which is ultrasonically sealed to the bladder layer. In some cases, the thigh seals are a laminated sponge fabric, the thigh seals cemented to the bladder layer around an outer circumference of each seal. In some cases, the fire-retardant fabric of the cover layer is Nomex. The cover layer can be formed from a plurality of separate sections stitched together with Nomex thread.

In some embodiments, the cover layer includes a lower region proximate the lower volume and an upper region proximate the upper volume. In the lower region, the cover layer can be lined with Dacron cloth having a relatively higher strength than the cover layer. In the upper region, the cover layer can include at least one attachment provision configured to allow an external component to be attached to an exterior of the cover layer. In some embodiments, the cover layer includes resizing areas. A first resizing area is located below the thigh seals, the first resizing area allowing the cover layer to be tightened above a knee region of the garment. A second resizing area is located below the first resizing area, the second resizing area allowing the cover layer to be tightened below the knee region.

In some embodiments, a liquid cooling layer is positioned on the interior of the bladder layer. A pass through device then defines a first channel and a second channel through the cover layer and bladder layer. The pass through device includes a first hose barb coupled to the first channel and a second hose barb coupled to the second channel, the hose barbs protruding from an exterior of the cover layer. The first channel is configured to receive a pressurized fluid and direct the pressurized fluid to the bladder layer and the second channel is configured to receive a cooling fluid and direct the cooling fluid to the liquid cooling layer.

In some embodiments, the garment includes a urine evacuation pass through providing a channel from the interior of the bladder layer proximate a groin region of the garment, through the bladder layer and cover layer, to an exterior of the garment. In some embodiments, the garment includes a urine evacuation device, the urine evacuation device including a tube and a waste container. The tube is configured to deliver urine from a groin region of the garment, through a urine evacuation pass through of the bladder layer, and to the waste container.

In some embodiments, the cover layer includes a plurality of adjustable seals configured to seal the cover layer to the user. The adjustable seals include a neck seal and two wrist seals. In some embodiments, the garment has a neck region and a foot region. In some cases, the bladder layer and the cover layer extend an entire length of the garment between the foot region and the neck region. In other cases, the cover layer extends an entire length of the garment between the foot region and the neck region and the bladder layer terminates proximate a waist region of the garment.

In some embodiments, the cover layer includes a main entry closure operative to selectively open or seal the cover layer. The cover layer can be configured to enclose a removable urine collection device connected to the interior of the bladder layer in a groin region of the garment via a pass through opening, the removable urine collection device accessible through the main entry closure. In some embodiments, the cover layer includes a plurality of removable pouches containing flotation devices.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
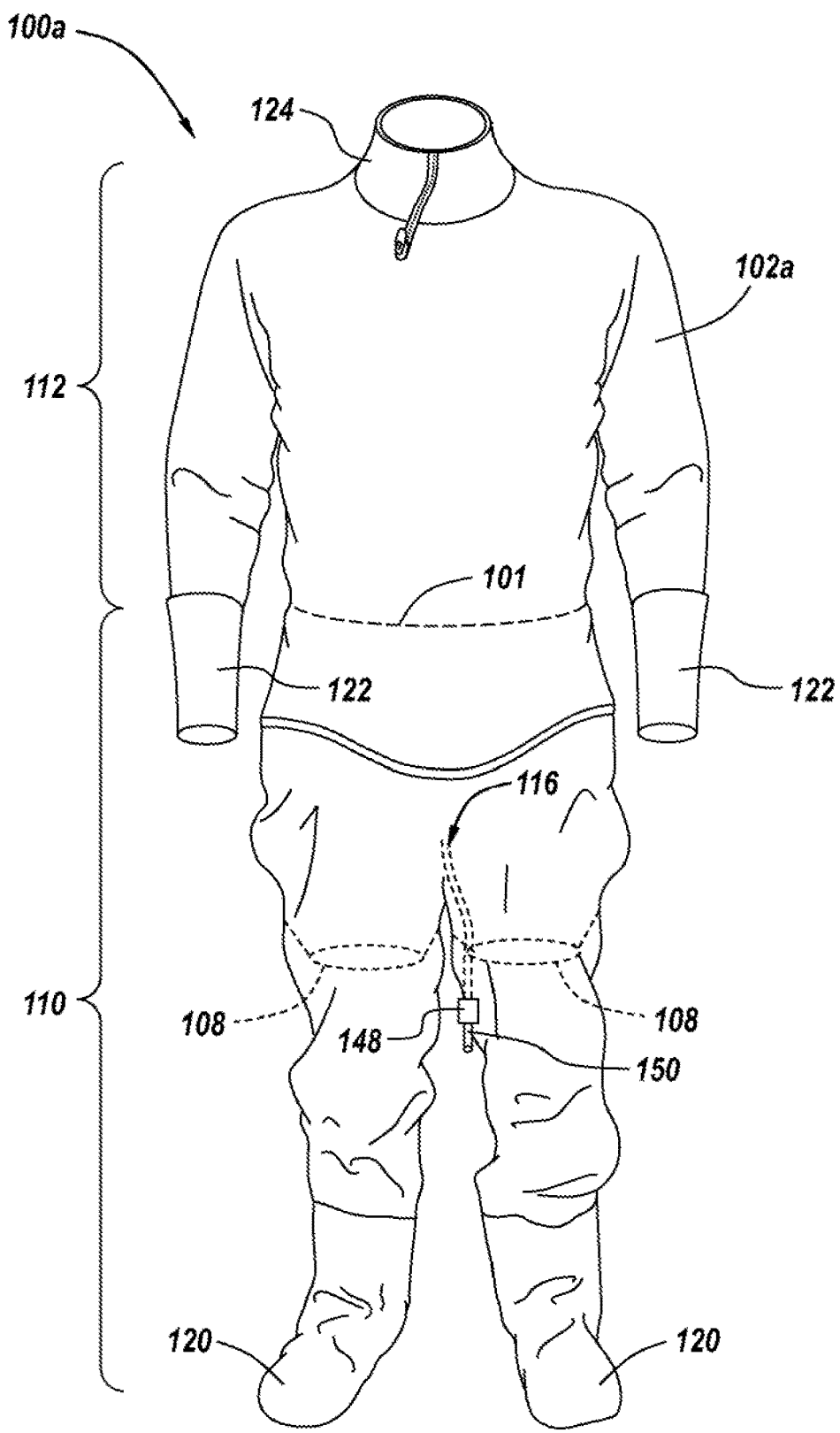
FIG. 1 is a front view of a bladder layer of a first embodiment of a garment in accordance with the subject technology.

The subject technology overcomes many of the prior art problems associated with protective suits for aviators. In brief summary, the subject technology provides a single aviation garment which is safe, comfortable, and provides unique features not available (or possible) in prior suits. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Figure 2:
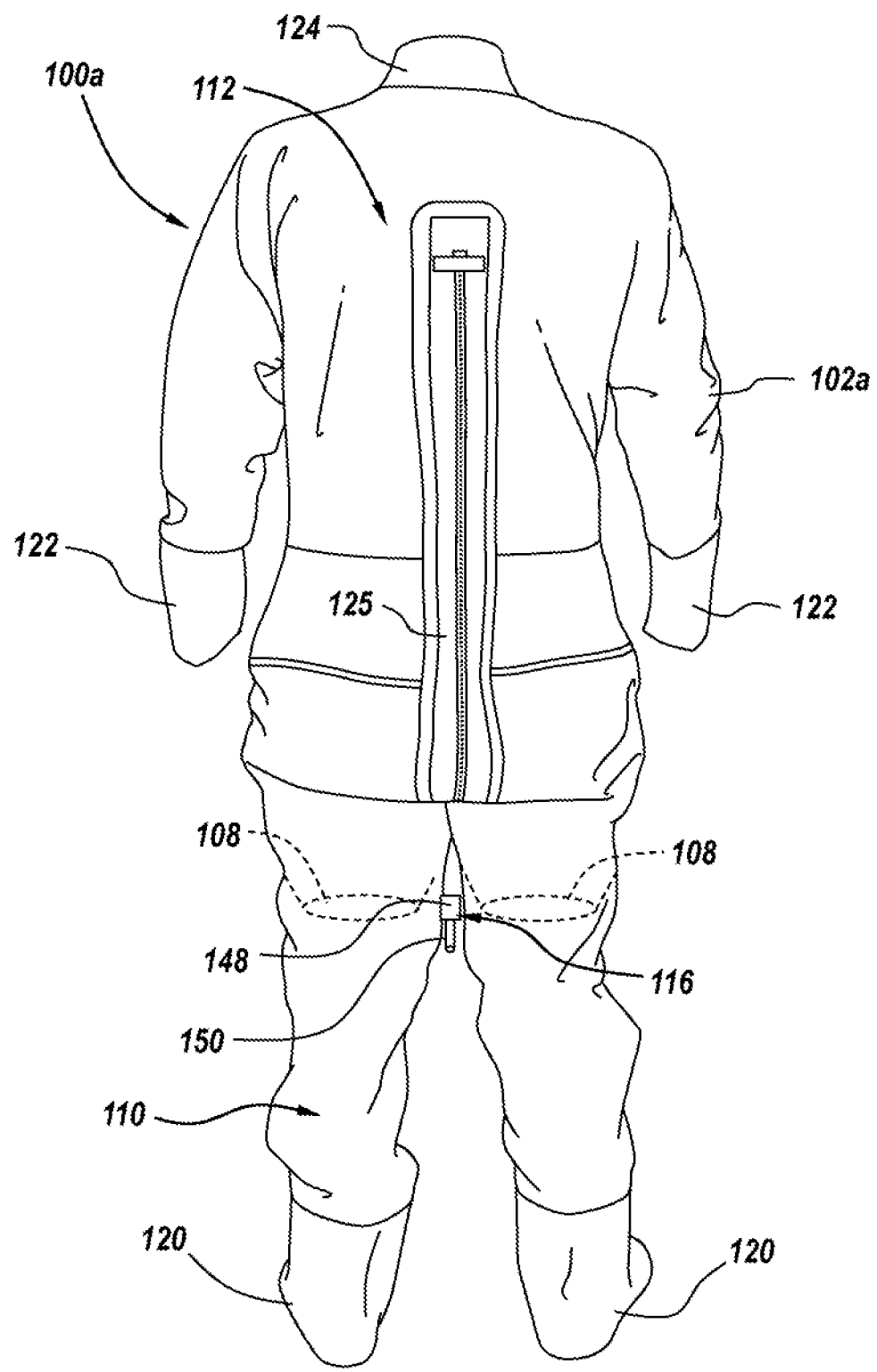
FIG. 2 is a rear view of the bladder layer of FIG. 1.
Figure 3:
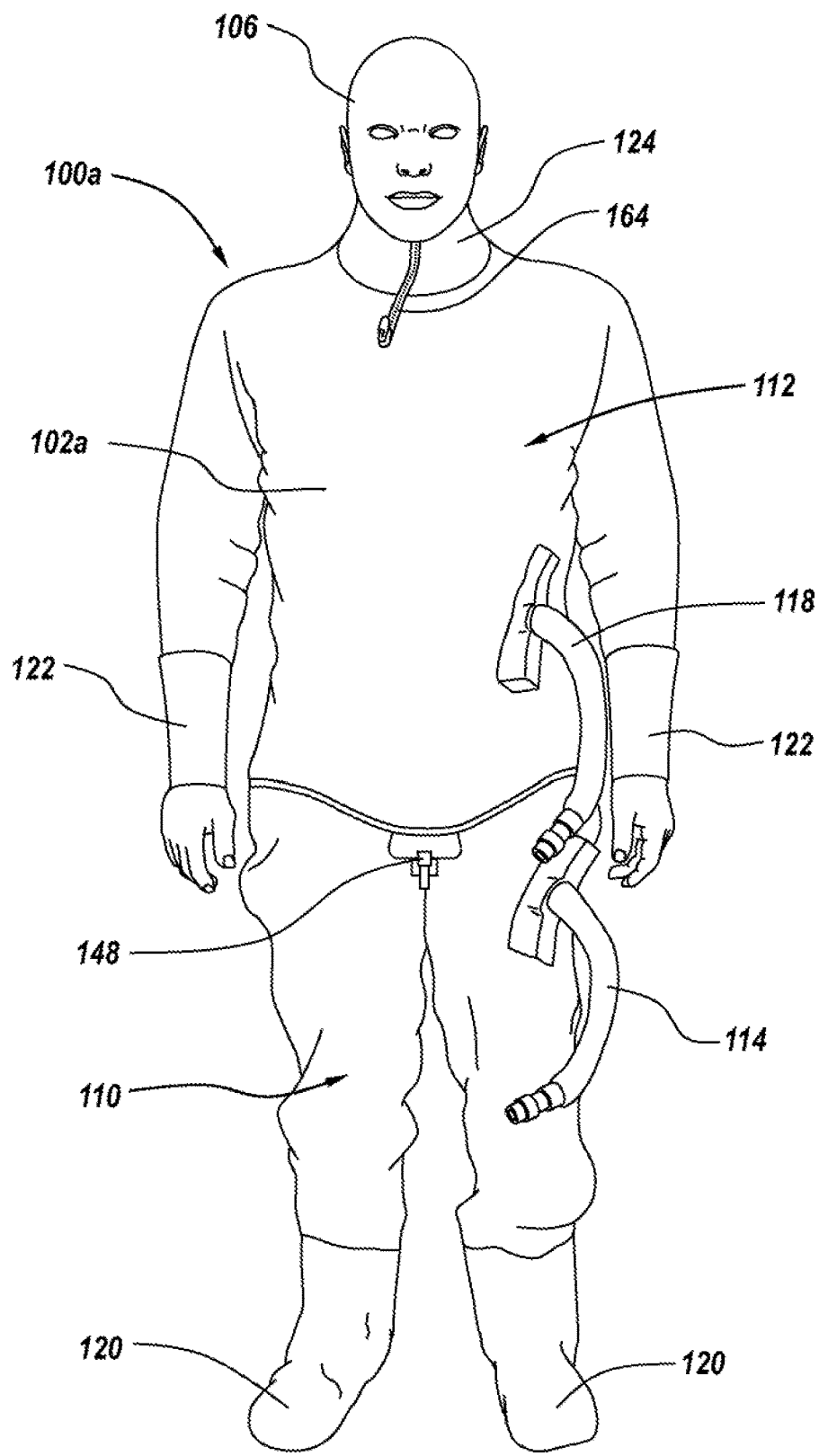
FIG. 3 is a front view of the bladder layer for the first embodiment being worn by a user.
Figure 4:
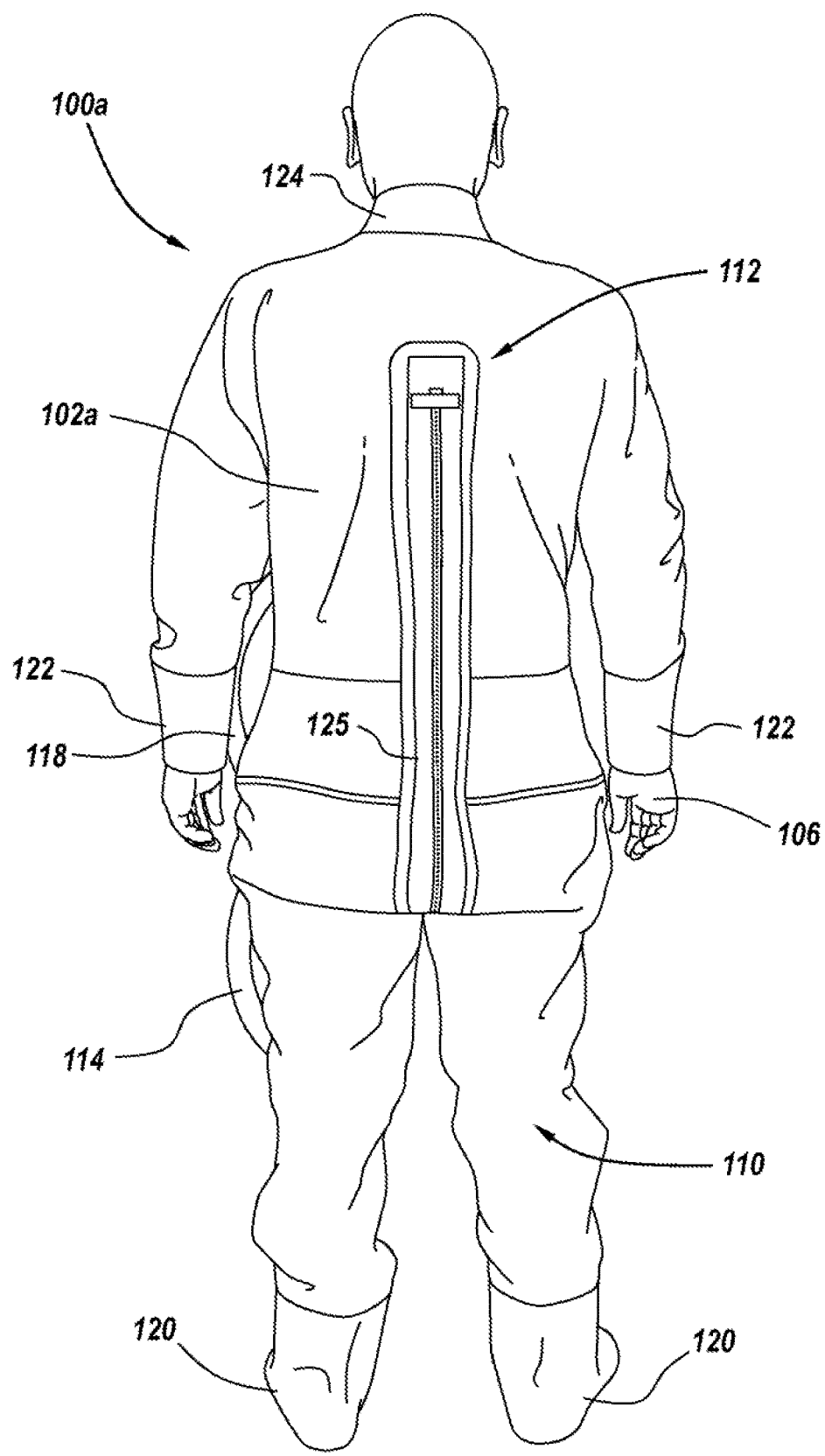
FIG. 4 is a rear view of the bladder layer of FIG. 3.
Figure 5:
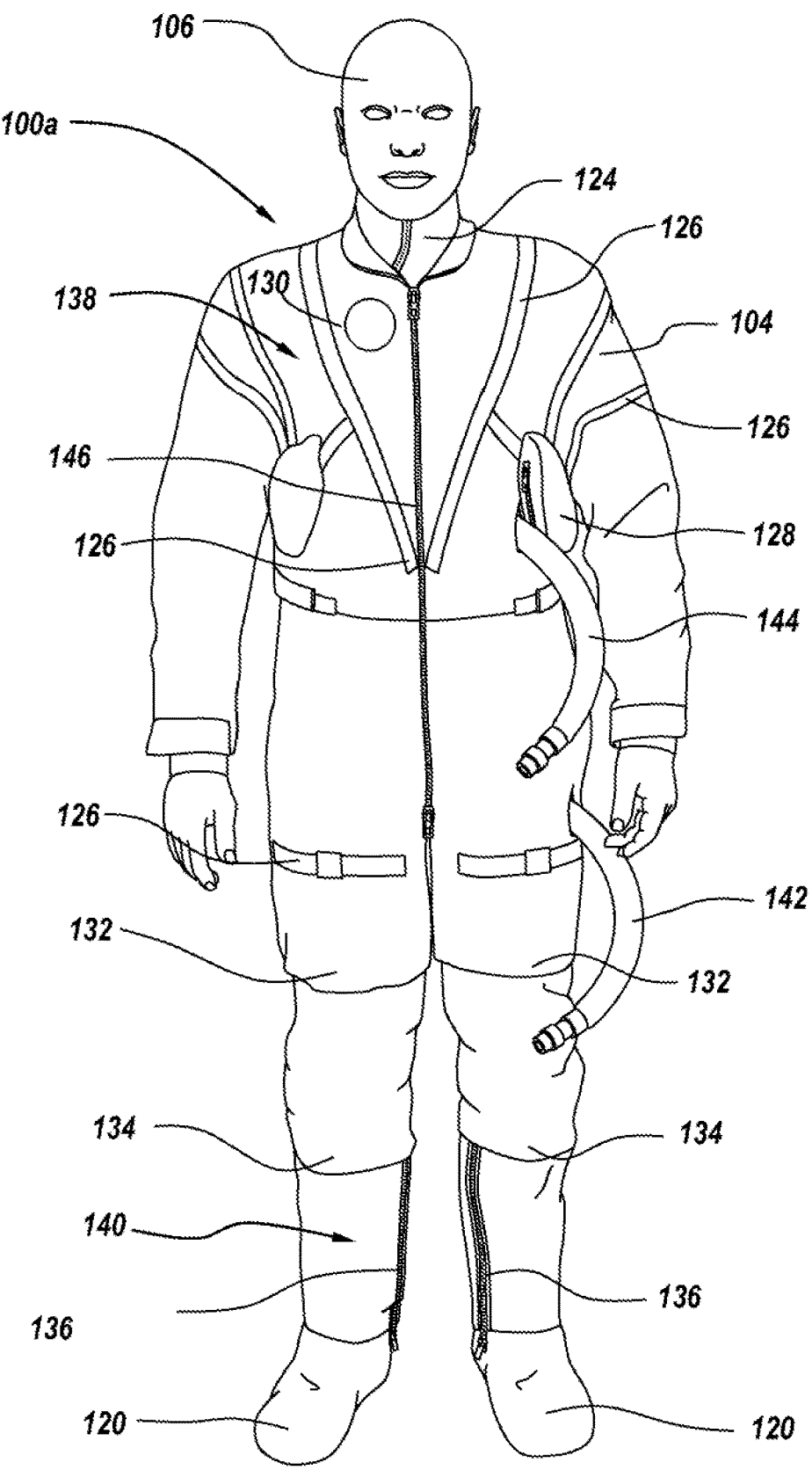
FIG. 5 is a front view of the full garment of the first embodiment being worn by a user.
Figure 6:
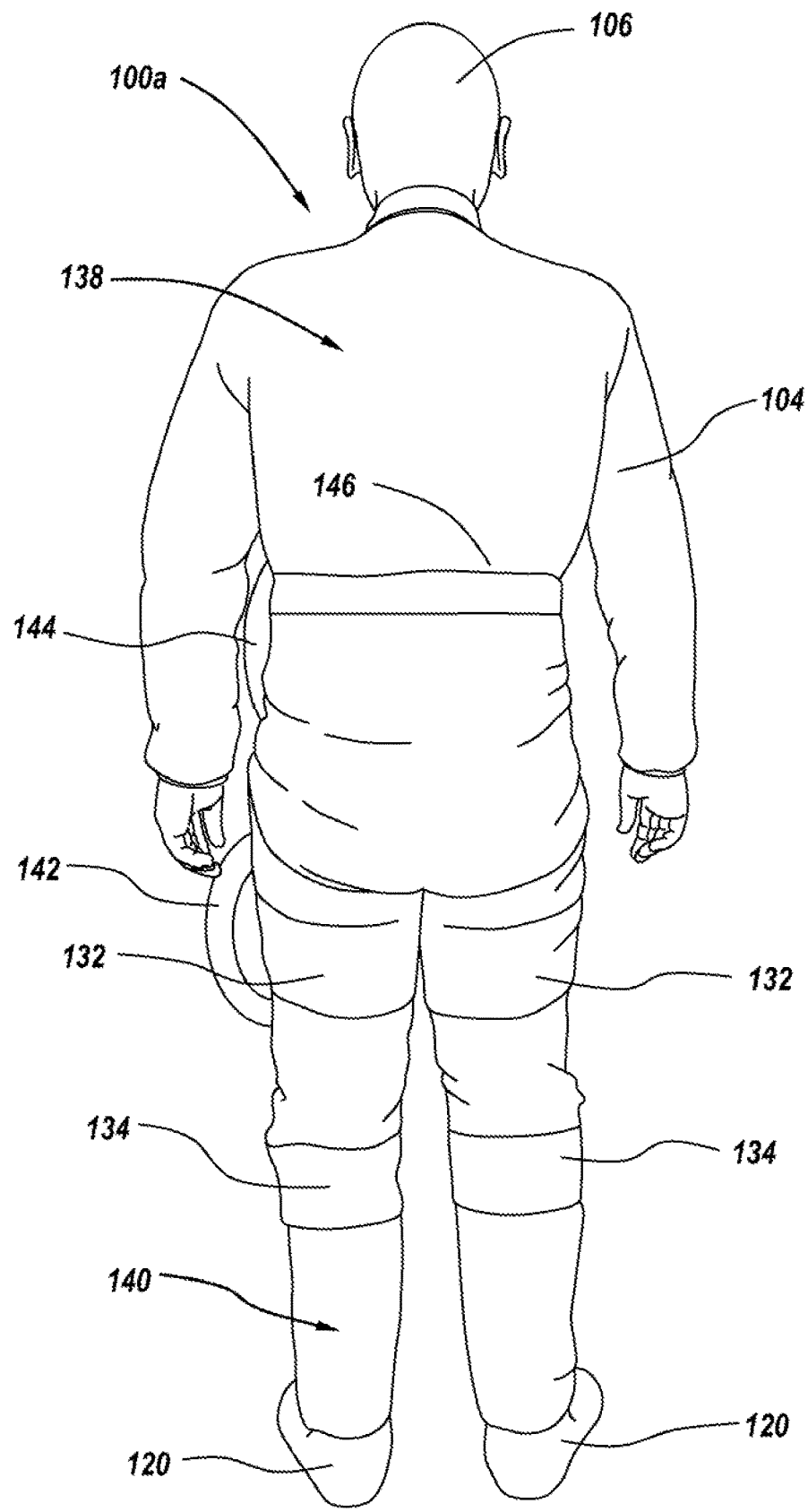
FIG. 6 is a rear view of the garment of FIG. 5.
Figure 7:
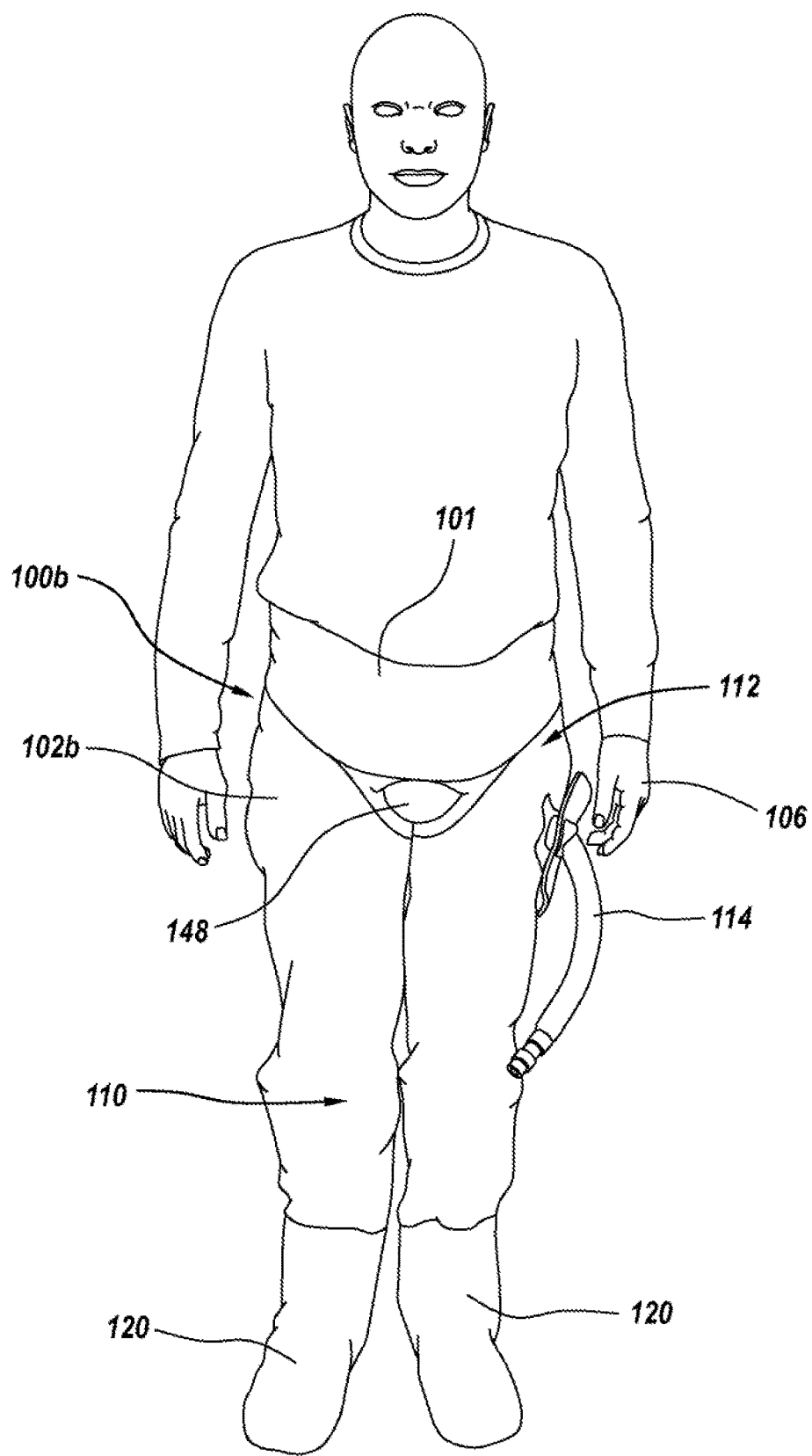
FIG. 7 is a front view of a truncated bladder layer for a second embodiment of a garment in accordance with the subject technology being worn by a user.
Figure 8:
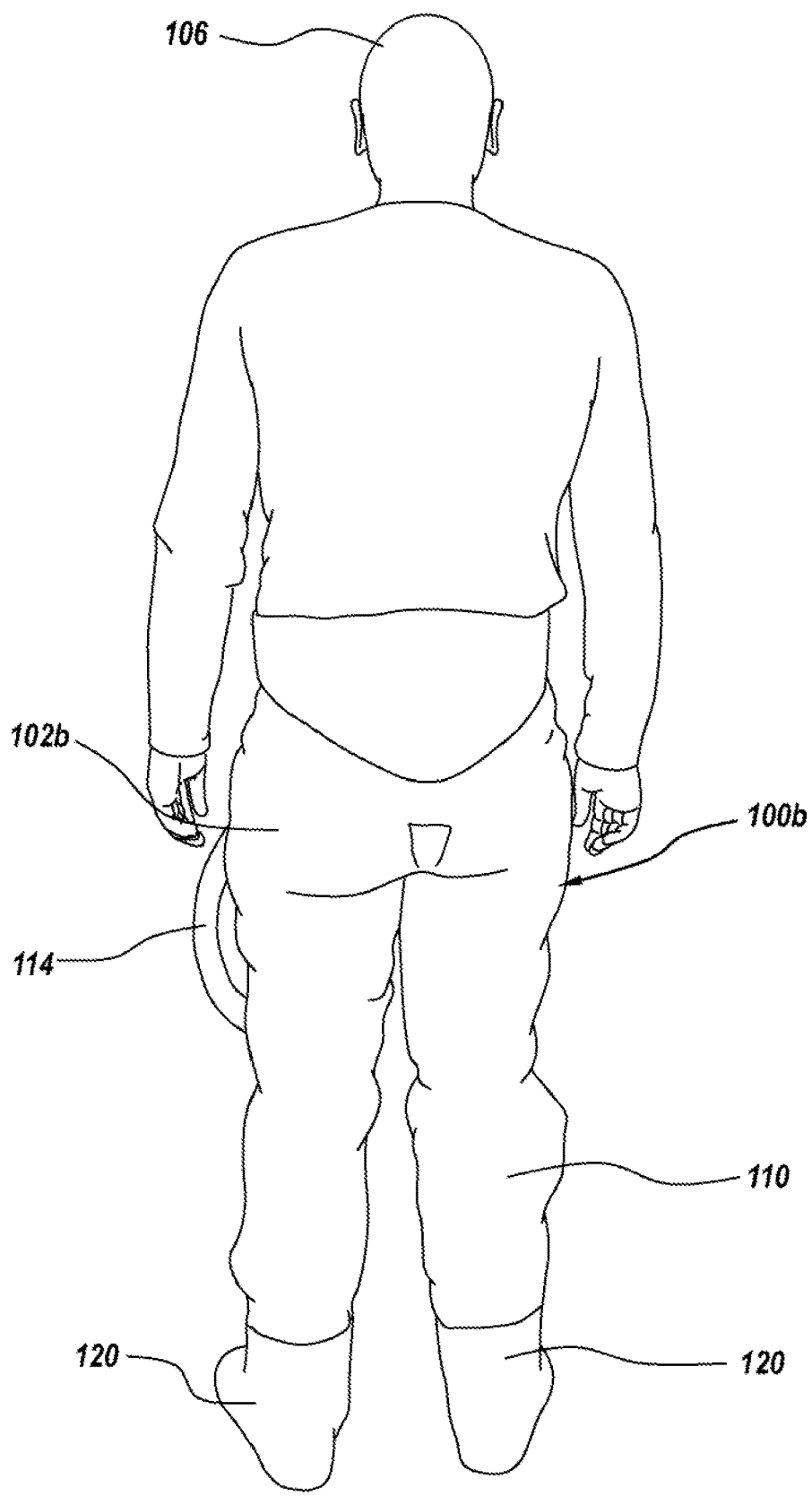
FIG. 8 is a rear view of the bladder layer of FIG. 7.
Figure 9:
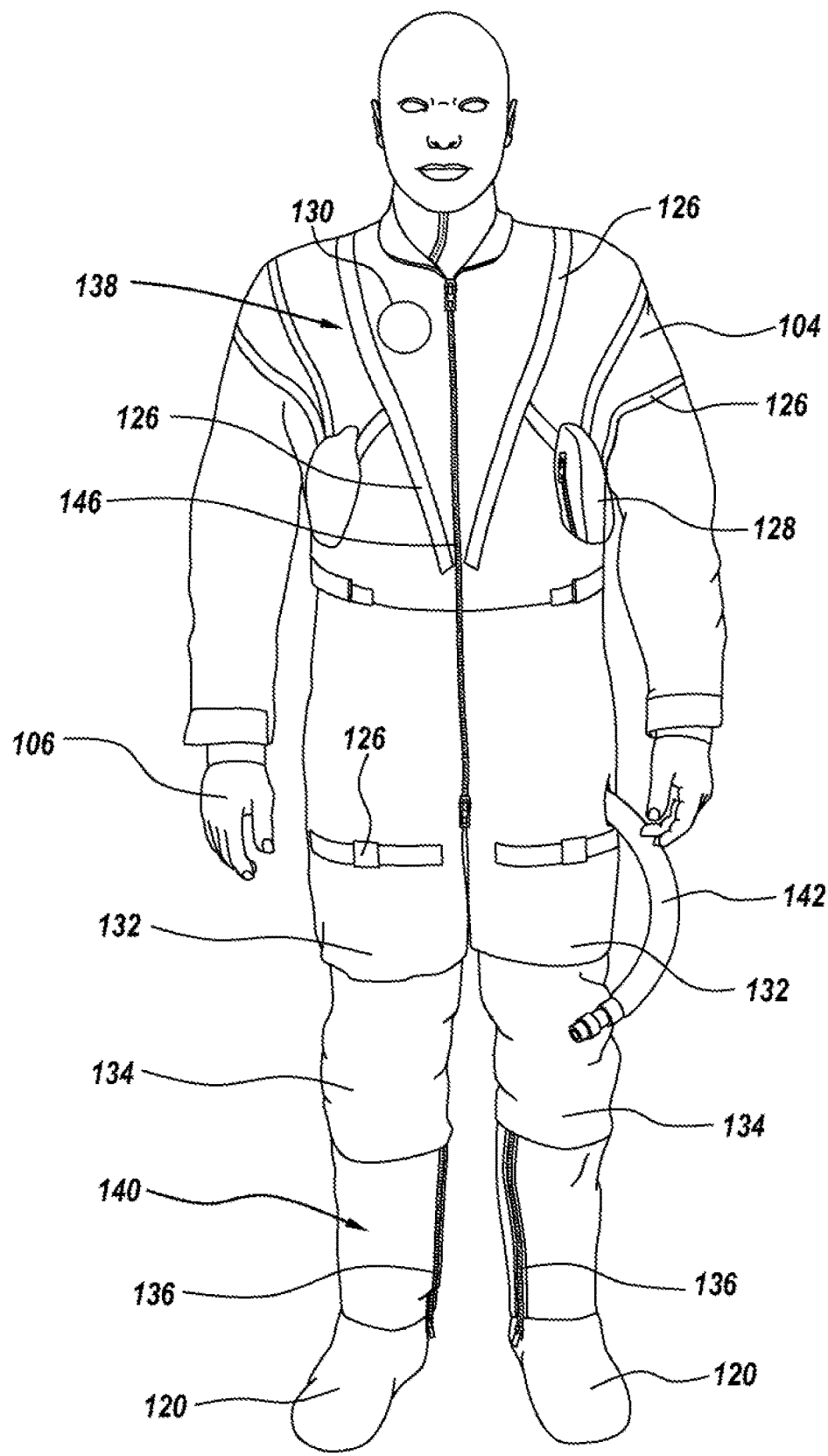
FIG. 9 is a front view of the full garment of the second embodiment being worn by a user.

Referring now to FIGS. 1-9, an aviation garment 100a, 100b (generally 100) in accordance with the subject technology is shown. In particular, FIGS. 1-2 show the exterior of a first embodiment of an aviation garment 100a when not in use, the garment 100a including a full length bladder layer 102a (i.e. inner layer). In this configuration, the bladder layer 102a is designed to encompass both the legs and torso of the user. FIGS. 3-6 show the first embodiment of the aviation garment 100a being worn by the user. FIGS. 7-9 show a second embodiment 100b of the aviation garment being worn by the user, the second embodiment including a truncated bladder layer 102b (see also, cutoff line 101 in FIGS. 1, 7 denoting the line at which the bladder layer 102b can be truncated just about a user's waste). A rear view of the exterior of the second embodiment is omitted, that view being substantially the same as that of the first embodiment of the garment 100a shown in FIG. 6. It should be understood that in FIGS. 3-4 and 7-8 the bladder layer 102a, 102b (generally 102) is shown separate from the cover layer 104 for ease of reference. However, when in use, the aviation garment 100 according to the subject technology will include both the bladder layer 102 and cover layer 104 integrated to work together to form a single garment 100 which can be worn by the user.

The garment 100 includes the bladder layer 102 which is designed to retain a pressurized fluid, such as air, to apply a force against the user 106 for g-protection. Thigh seals 108 are integrated within the interior of the bladder layer 102 in a thigh region of the suit to seal the bladder layer 102 to the thighs of the user 106. The thigh seals 108 separate the bladder layer 102 into a lower portion 110 around the lower thighs and legs of a user 106, and an upper portion 112 which extends around the upper thighs and torso of the user 106. By sealing to the user 106, the thigh seals 108 create two distinct volumes, allowing the upper portion 112 to be pressurized to a different pressure than the lower portion 110. The thigh seals 108 can be a laminated sponge fabric, cemented to the bladder layer 102 around the outer circumference of each thigh seal 108 to provide the desired seal against the user's thighs. In general, the lower portion 110 can be pressurized up to 12 psig to provide g-force protection during flight. A lower pressure tube 114 is sealed to the bladder layer 102 to provide a channel for pressurized fluid to enter the interior of the bladder layer 102 from an external source (not shown distinctly). In general, the external source can be a pump system or the like configured to pressurize air for delivery to the bladder layer 102.

In the first embodiment of the garment 102a, where the upper portion 112 of the bladder 102a is full length and covers the torso of a user 106, the upper portion 112 can be pressurized up to 50 mmHg. A pressurized upper portion 112 can provide air cooling and torso counter pressure for a user 106 for comfort during flight. Further, the garment 102 may include a urine evacuation device 116, as discussed in more detail below, and the pressurized upper portion 112 can then assist in urine evacuation. An upper pressure tube 118 is sealed to the bladder layer 102 in the upper portion 112 to provide a channel for the pressurized fluid to enter the interior of the bladder layer 102 in the upper portion 112. The upper tube 118 can connect to an external source, separate from the source connected to the lower pressure tube 114, to facilitate delivering lower pressure air to the upper portion 114. Notably, for environments where the pressurized upper portion 112 is unnecessary, the embodiment of the garment 100b shown in FIGS. 7-9 may be used, with the bladder layer 102b being truncated above the user's waist (see also cutoff line 101 in FIG. 1) to make a less cumbersome garment. In the truncated embodiment 100b, the upper volume 112 is not enclosed to retain pressure and the upper pressure tube 118 is omitted.

The bladder layer 102 is formed from a lightweight, selectively permeable material which allows water vapor to pass through for the evaporation of perspiration from a user 106. The bladder layer 102 is impermeable to the pressurized fluid (which can be air including oxygen, nitrogen, etc., for example) to maintain the desired pressure within the lower and upper portions 110, 112 of the bladder layer 102. The fabric of the bladder layer 102 can be stitched together with nylon thread and the seams of the fabric can be taped internally to ensure there are no gaps in the sealed bladder layer 102. Boots 120 are integrally formed as part of the bladder layer 102 at a foot region (i.e. designed to conform to a user's foot). The boots 120 are both air and water tight to provide immersion protection. The boots 120 can be fabricated from a urethane-coated nylon fabric, ultrasonically sealed at the seams connecting the boots 120 to the bladder layer 102.

In the embodiment with the full length bladder layer 102a, the bladder layer 102a can also include seals 122, 124 for sealing to the extremities of the user 106. Wrist seals 122 provide a seal in the region of the garment 100a proximate the wrists of the user 106, allowing the user's hands to extend from the bladder layer 102a. The bladder layer 102a can also include a neck seal 124 to seal the bladder layer 102a to the user's upper torso and/or neck, allowing the user's head to extend from the top of the bladder layer 102a. A zipper 125 is positioned on the rear of the bladder layer 102a, the zipper 125 allowing the user to initially open and step into the bladder layer 102a when donning the garment 100a.

One problem often faced by crewmembers in high performance aircraft is the inability to urinate after a flight garment is equipped. This results in the crewmember dehydrating themselves in preparation for flight which can result in discomfort, or even danger. Further, even in garments that allow urination, the crewmember will normally need to compromise their equipment or restraints temporarily to do so. To overcome this problem, the garment 100 includes the urine evacuation device 116 which can be comprised of several different components that allow for a user to urinate directly into the urine evacuation device 116. First, an anatomy interface device is included (not shown distinctly herein) to couple to the user's anatomy to receive the urine. Such devices are known and used currently in fields outside of aviation, and can be particularly designed to interface with a male or female user. The bladder layer 140 then includes a pass through opening 148 which seals around a tube 150 (see FIG. 1). The tube 150 connects to the anatomy interface device to receive the urine and transport it through the bladder layer 102. On the end opposite the anatomy interface device, the tube 150 can be connected to a waste container to collect and dispose the urine. As such, the urine evacuation device 116 allows the user 106 to urinate during a flight without removing the garment 100. The urine evacuation device 116 can included in either bladder layer 102 embodiment. The cover layer 104 can be formed with corresponding openings (not shown distinctly) to seal around the tube 150 as needed. In the embodiment of the garment 100b with the truncated bladder layer 102b, the waste container, or urine collection device, may be worn inside the cover layer 104 and accessed through the main entry closure (i.e. front zipper 146).

In both embodiments, the garment 100 includes a cover layer 104 outside the bladder layer 102 which fits over the arms, torso, legs, and feet of the user 106. The cover layer 104 serves the purposes of a traditional flyer coverall, and also includes additional features, as will be discussed in more detail herein. Unlike a traditional flyer coverall, the cover layer 104 is positioned over the bladder layer 102 to support the functionality of the bladder layer 102 and create a less bulky garment 100.

In general, the cover layer 104 provides protection to the user from possible environmental hazards, including a potential aircraft fire, and also serves some operational, comfort, and aesthetic purposes. To that end, the cover layer 104 includes provisions 126 for attaching external components in an upper half 138 of the garment 100. This can include the attachment of floatation devices 128, if desired, which can be optionally attached for flights over water. In the example shown, the floatation devices 128 are pouches which are connected to the suit without hindering mobility or comfort, and are removable for maintenance, overhaul, and repair. In other cases, the attachment provisions 126 can be used for attaching pockets for storage, or for the attachment of a patch 130, insignia, name tags, or other aesthetic components. In the example shown, the provisions 126 include a number of Velcro strips integrated as part of the cover layer 104, to allow for Velcro components to be quickly and easily removably attached to the cover layer 104. The provisions 126 can also include an area of the suit that is designed to be punctured, allowing patches 130 or the like to be permanently sewn to the cover layer 104. It should be understood that the attachment provisions 126 shown are exemplary only, and other provisions 126 may be included depending on the intended use of the garment 100 and preferences of the user 106.

Upper and lower resizing areas 132, 134 are included above and below the user's knees, respectively. The resizing areas 132, 134 include a laced region (covered by standard cover layer 104 material) which can be tightened to shorten the leg length of the garment 100, if desired, for a better fit. The lower ankle region of the cover layer 104 also includes slide fasteners 136, running axially on inner side of the user's leg. When donning or removing the garment 100, the slide fasteners 136 can be opened to allow for an expansion in the leg region of the cover layer 104, making it easier to put on or take off the garment 100. Once the garment 100 is equipped by the user, the slide fasteners 136 can be closed. Similarly, a front zipper 146 extends from groin region to the neck region of the cover layer 104, allowing for the garment 100 to be easily put on or taken off, and securely closed thereafter.

The cover layer 104 includes lower and upper sleeves 142, 144 conforming around the lower and upper pressure tubes 114, 118, respectively, allowing the tubes 114, 118 to pass through the cover layer 104. The cover layer 104 can be formed from a fire-retardant Nomex fabric and stitched together with Nomex thread. The lower half 140 of the cover layer 104 is lined with high strength, low elongation Dacron cloth for additional protection. This material in the lower half 140 also works together with the bladder layer 102 to help restrain the bladder layer 102 and bear the pressure loads felt in the lower half 140 (e.g. 12 psig in some cases) when the bladder layer 102 is pressurized. Thus, the bladder layer 102 relies on the cover layer 104 to help retain the pressure on the user.

Figure 10:
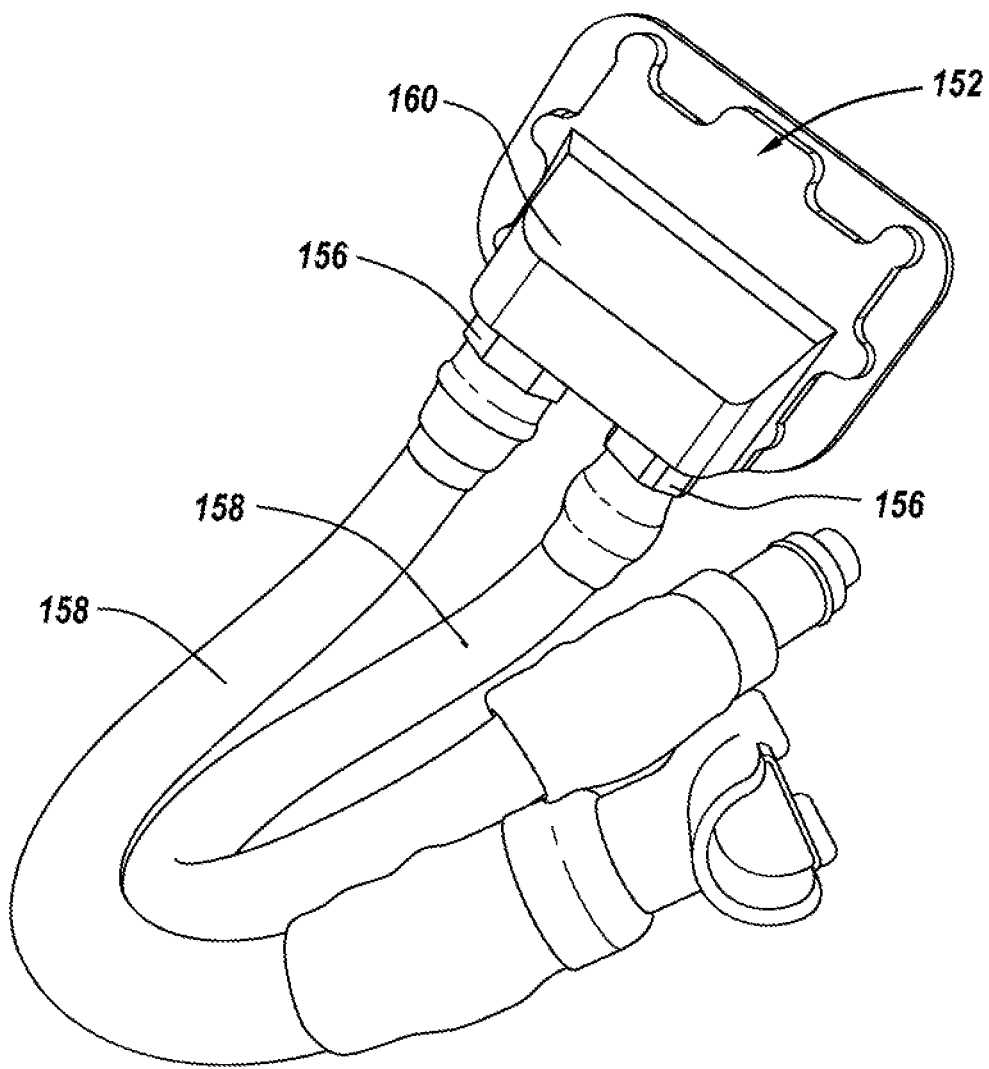
FIGS. 10-11 are perspective views of a pass through device for a garment in accordance with the subject technology.
Figure 11:
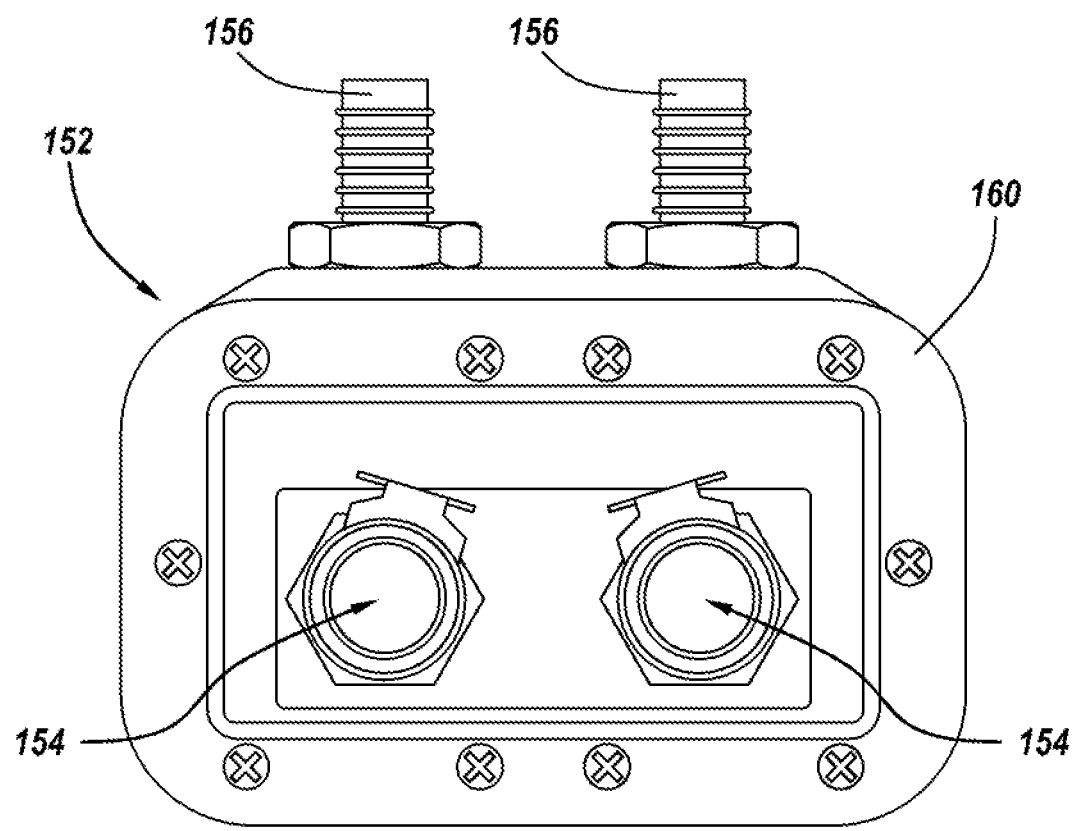
Figure 12:
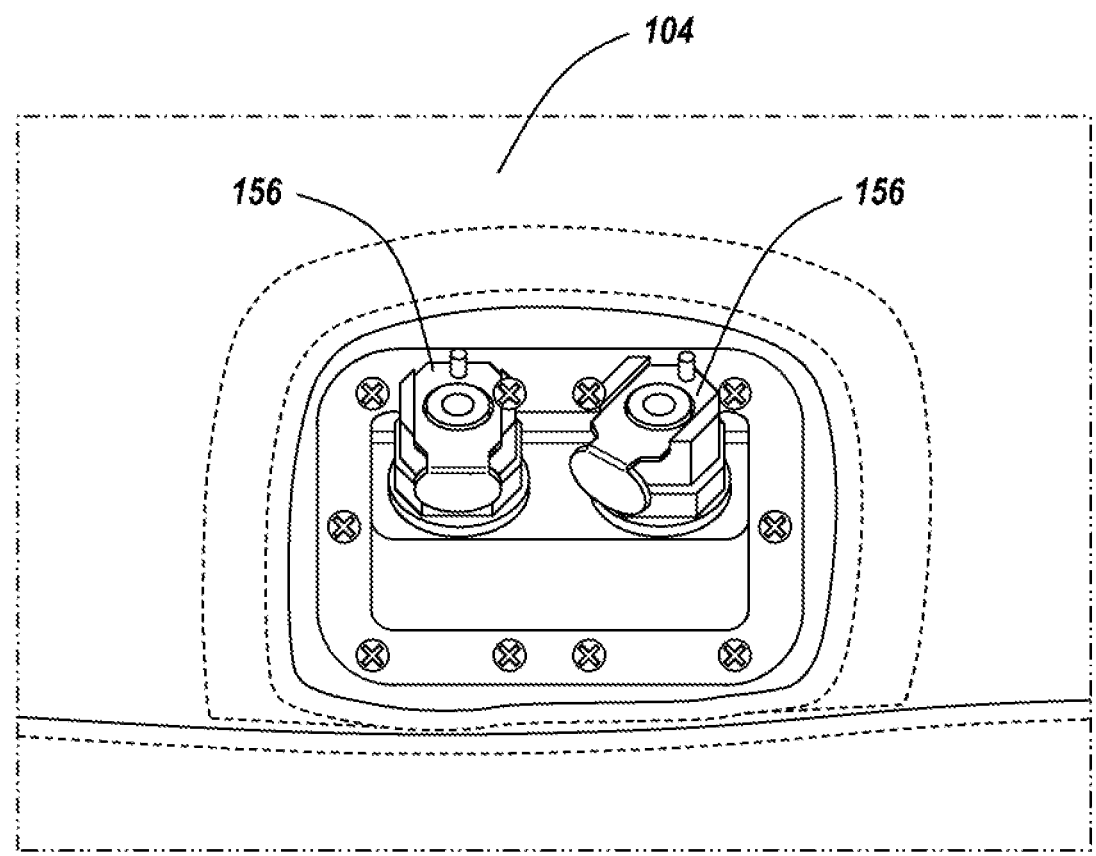
FIG. 12 is a perspective view of the exterior of a cover layer for a garment including protruding hose barbs from a pass through device, in accordance with the subject technology.
Figure 13:
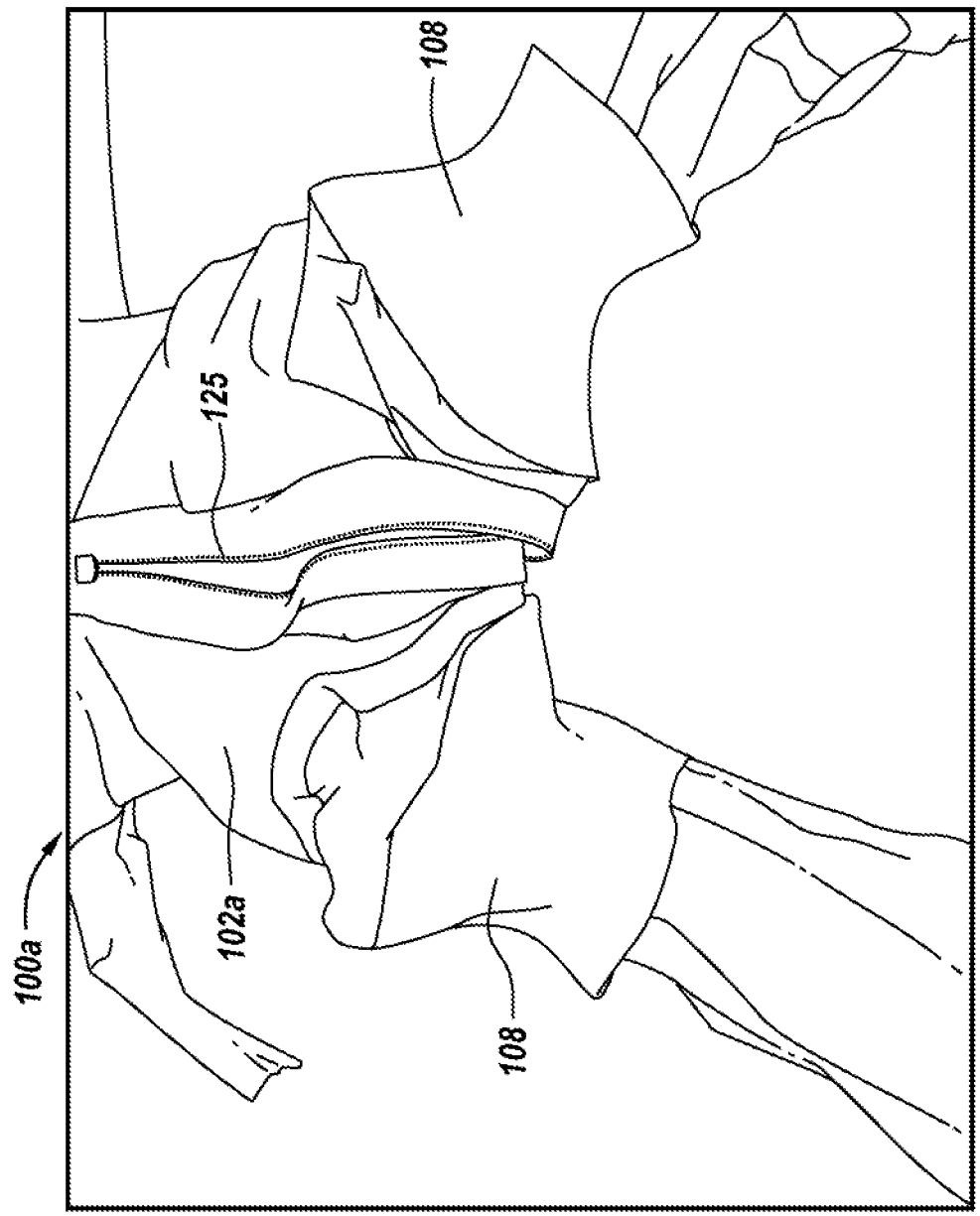
FIGS. 13-16 are perspective views of the bladder layer of the first embodiment turned inside out to more easily illustrate certain features.

Referring now to FIGS. 10-12, in some cases, the garment 100 can include an additional liquid cooling layer (not shown distinctly which can be integrated as part of the garment 100. The cooling layer represents the most interior layer and is positioned directly against the user when the garment 100 is worn. The cooling layer can cover at least the torso of the user, but can also be configured to encompass the lower body, legs, and/or arms, as desired, and therefore is shaped to conform to the user's body as desired. An internal pass through device 152 is sealed within the interior of the garment 100, defining two channels 154 through all external layers (which can include the cover layer 104, bladder layer 102, and the liquid cooling layer, if included). A similar pass through device (not shown separately) is positioned on the exterior of the garment 100 and connected to the internal pass through device 152 with channels 154 of the pass through devices 152 connected to provide a fluid path between the interior and exterior of the garment 100. Each pass through device 152 includes hose barb 156 fluidly coupled to each channel 154. The hose barbs 156 allow hoses 158 to be easily attached thereto to form a fluid connection with respective channels 154. On the interior side, hoses 158 can be connected to the barbs 156 to deliver the desired fluid, such as cooling liquid, to the correct area of the cooling layer within the garment 100. On the exterior side, the cover layer 104 can be designed to fit over the body 160 of the pass through device 152, while allowing the barbs 156 to protrude from the exterior (see FIG. 12). The barbs 156 in FIG. 12 are shown with quick connects, allowing hoses from the aircraft to be easily connected to the protruding barbs 156 to receive and circulate the cooling fluid between the aircraft and liquid cooling layer through the channels 154. In one embodiment, two channels 154 connecting between opposing barbs 156 (one barb 156 in the interior of the suit and one barb 156 on the exterior of the suit) can be used for cooling liquid in the upper volume of the bladder layer 102a while the other connected channels 154 and opposing barbs 156 can be used for pressurized air in the lower volume 110 of the bladder layer 102a. Further, in some embodiments, a pass through device 152 can be used in lieu of pressure tubes 118, 144 to deliver cooling liquid to an upper portion 112 of the bladder layer 102 around the user's torso. Or, in cases where the upper pressure tubes 118, 144 are used to deliver air pressure to the upper portion 112, pass through devices 152 can be used to additionally deliver cooling liquid to the cooling layer around the user's torso (or elsewhere).

Referring now to FIGS. 13-16, the bladder layer 102a is shown inside out to better illustrate various internal components. The rear zipper 125 runs from the upper torso of the garment bladder layer 102a, through the groin region and can extend substantially to the area of the urine evacuation device 116. The thigh seals 108 are attached to the bladder layer 102a at their upper ends, extending away from the bladder layer 102a at their lower ends. Therefore, when the bladder layer 102a is worn by the user, the thigh seals 108 will narrow to a smaller inner diameter toward their bottom ends, forming a tight seal against the user's thigh.

Figure 14:
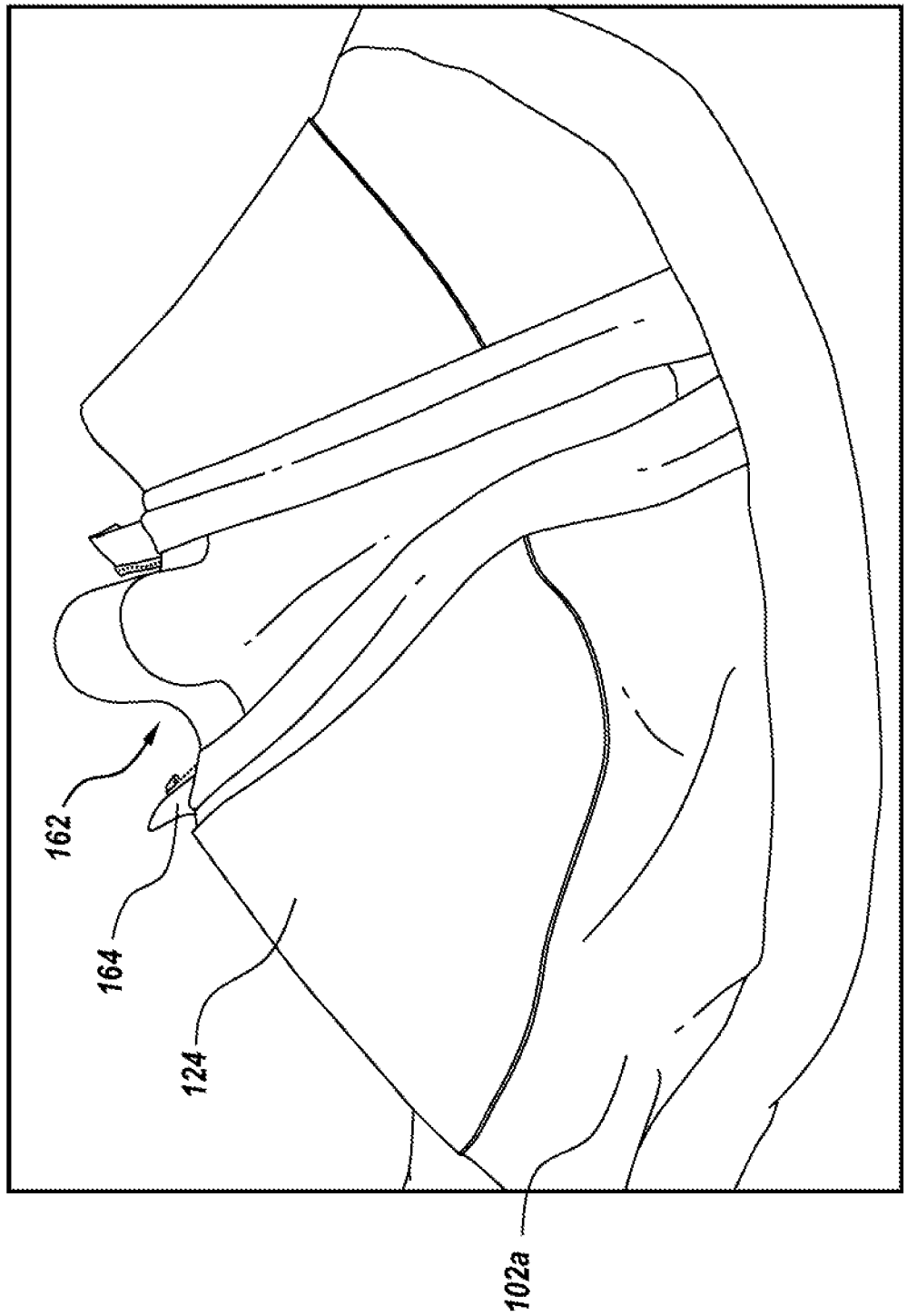

As best shown in FIG. 14, the neck seal 124 is also sealed to the interior of the bladder layer 102a. The neck seal 124 narrows towards an opening 162 through which a user's head can exit the bladder layer 102a. A zipper 164 (see also FIG. 3) is positioned on the exterior of the bladder layer 102a and extends from the bottom of the neck seal 124 to the opening 162. Once the user has donned the garment 100a, the zipper 164 can be closed to close the neck seal 124 around the upper torso and/or neck of the user and seal the upper volume 112 of the bladder layer 102a. Further, the zipper 164 can be utilized to adjust the width of the seal 124 to ensure a proper fit.

Figure 15:
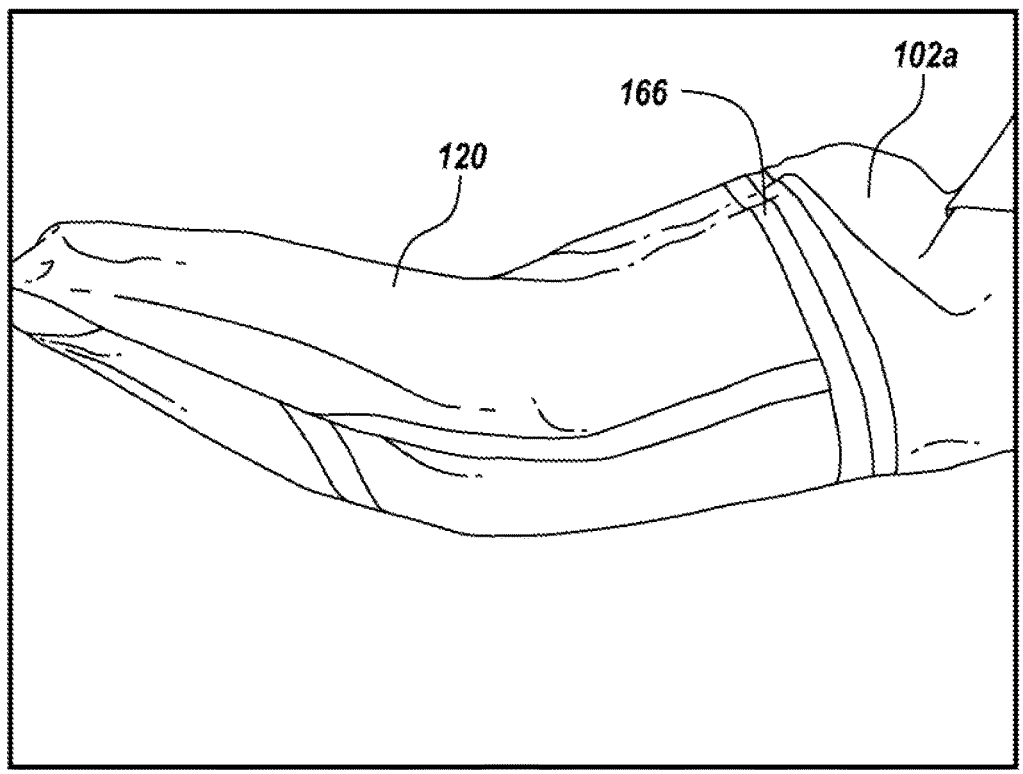

As best shown in FIG. 15, the boots 120 are integrally and permanently formed as part of the bladder layer 102a. A seam 166 is visible where the air and water tight fabric of the boot 120 was originally ultrasonically sealed to the ankle region of the bladder layer 102a. The final product is a boot 120 which is fully integrated into the bladder layer 102a, with no separate connecting components or seals required.

Figure 16:
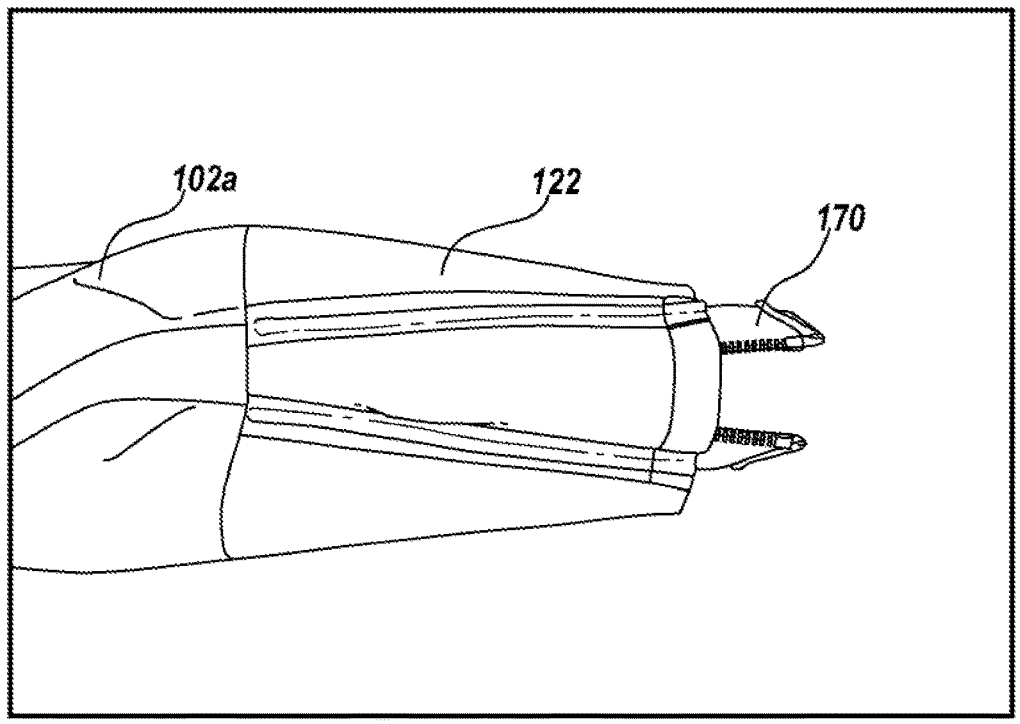
Figure 17:
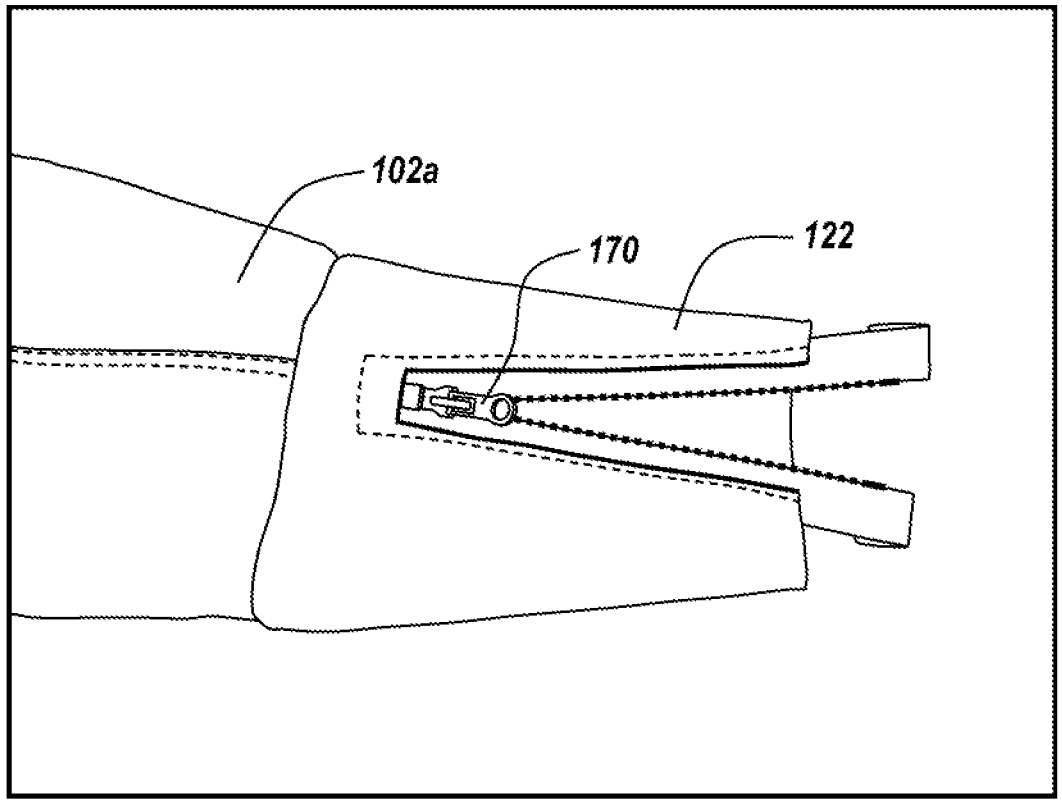
FIG. 17 is a front view of a wrist seal of the bladder layer of the first embodiment.

Referring now to FIGS. 16-17, a wrist seal 122 of the bladder layer 102a is shown. FIG. 16 shows the wrist seal turned inside out to view the interior, while FIG. 17 shows the wrist seal 122 as viewed from the exterior. The wrist seals 122 narrow from the arm portion of the bladder layer 102a to an opening 168 at the end from which the user's hand would protrude during use. The seal 122 includes a zipper 170 which can be closed to close the wrist seal 122 around the wrist of the user. Further, the zipper 170 can be adjusted to ensure a proper fit to the user's wrist. Notably, while the exemplary wrist and neck seals 122, 124 are shown as including zippers 164, 170, it should be understand that that seals 122, 124 need not include zippers in all embodiments.

Overall, the aviation garment 100 disclosed herein is a suit which performs all of the functions of multiple, separate garments that are typically worn together and on top of each other. Additionally, the garment 100 is functionally improved and provides features which are not present in traditional aviation garments as disclosed herein, such as urine evacuation and air cooling. The garment 100 is able to adequately provide g-protection and immersion protection while reducing the weight, bulk, and thermal burden of previous solutions. Further, if immersion protection is not required, the garment 100b can be utilized which provides an even less bulky solution, with a truncated bladder layer 102b which does not include a pressurized upper volume around the user's torso. The garment 100 also provides breathability through internal fluid flow, and even can provide liquid and/or air cooling as desired.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:
1. A garment configured to protect a user during aircraft flight, the garment comprising:
   a bladder layer configured to retain a first pressurized fluid and apply pressure to the user, the bladder layer being a semi-permeable layer which is impermeable to both oxygen and nitrogen and permeable to water vapor;

a first fluid tube formed as part of the bladder layer and configured to deliver the first pressurized fluid to an interior of the bladder layer;

a cover layer formed from a fire-retardant fabric, the cover layer surrounding an exterior of the bladder layer, the cover layer sealed around the first fluid tube and allowing the first fluid tube to pass therethrough; and two thigh seals configured to seal the bladder layer to the user such that the bladder layer forms a lower volume and an upper volume, wherein the first fluid tube is configured to deliver the first pressurized fluid to the lower volume.

2. The garment of claim 1, further comprising:

a second fluid tube formed as part of the bladder layer and configured to deliver a second pressurized fluid to the interior of the bladder layer at the upper volume, wherein the cover layer is sealed around the second fluid tube, allowing the second fluid tube to pass therethrough.

3. The garment of claim 2, wherein:

the upper volume is configured to be pressurized up to 50 mmHg; and the lower volume is configured to be pressurized up to 12 psig.

4. The garment of claim 1, wherein:

the bladder layer is formed from a plurality of separate sections stitched together with nylon thread; and seams of the nylon thread are sealed with tape within the interior of the bladder layer.

5. The garment of claim 4, wherein the bladder layer includes a boot region defined by an air and water impermeable fabric in the shape of boots.

6. The garment of claim 5, wherein the air and water impermeable fabric is urethane-coated nylon which is ultrasonically sealed to the bladder layer.

7. The garment of claim 1, wherein the thigh seals are a laminated sponge fabric, the thigh seals cemented to the bladder layer around an outer circumference of each seal.

8. The garment of claim 1, wherein the fire-retardant fabric of the cover layer is meta-aramid fabric.

9. The garment of claim 1, wherein the cover layer is formed from a plurality of separate sections stitched together with meta-aramid fabric thread.

10. The garment of claim 1, wherein:

the cover layer includes a lower region proximate the lower volume and an upper region proximate the upper volume;

in the lower region, the cover layer is lined with low elongation cloth having a relatively higher strength than the cover layer; and in the upper region, the cover layer includes at least one attachment provision configured to allow an external component to be attached to an exterior of the cover layer.

11. The garment of claim 1, wherein the cover layer includes:

a first resizing area located below the thigh seals, the first resizing area allowing the cover layer to be tightened above a knee region of the garment; and a second resizing area below the first resizing area, the second resizing area allowing the cover layer to be tightened below the knee region.

12. The garment of claim 1, further comprising:

a liquid cooling layer positioned on the interior of the bladder layer; and a pass through device defining a first channel and a second channel through the cover layer and bladder layer, the pass through device including a first hose barb coupled to the first channel and a second hose barb coupled to the second channel, the hose barbs protruding from an exterior of the cover layer, wherein the first channel is configured to receive a pressurized fluid and direct the pressurized fluid to the bladder layer and the second channel is configured to receive a cooling fluid and direct the cooling fluid to the liquid cooling layer.

13. The garment of claim 1, further comprising a urine evacuation pass through providing a channel from the interior of the bladder layer proximate a groin region of the garment, through the bladder layer and the cover layer, to an exterior of the garment.

14. The garment of claim 1, further comprising a urine evacuation device, the urine evacuation device including a urine evacuation tube and a waste container, wherein the urine evacuation tube is configured to deliver urine from a groin region of the garment, through a urine evacuation pass through of the bladder layer, and to the waste container.

15. The garment of claim 1, wherein the cover layer includes a plurality of adjustable seals configured to seal the cover layer to the user including:

a neck seal; and two wrist seals.

16. The garment of claim 1, wherein:

the garment comprises a neck region and a foot region; and the bladder layer and the cover layer extend an entire length of the garment between the foot region and the neck region.

17. The garment of claim 1, wherein:

the garment comprises a neck region and a foot region; and the cover layer extends an entire length of the garment between the foot region and the neck region; and the bladder layer terminates proximate a waist region of the garment.

18. The garment of claim 17, wherein:

the cover layer includes a main entry closure operative to selectively open or seal the cover layer; and the cover layer is configured to enclose a removable urine collection device connected to the interior of the bladder layer in a groin region of the garment via a pass through opening, the removable urine collection device accessible through the main entry closure.

19. The garment of claim 1, wherein the cover layer includes a plurality of removable pouches containing flotation devices.

* * * * *